No. 770,925. PATENTED SEPT. 27, 1904.
R. R. PYLE.
DEVICE FOR HOLDING SPOONS.
APPLICATION FILED MAR. 16, 1904.

NO MODEL.

Witnesses
R. A. Boswell.
N. A. Mayhew.

Inventor
Reese R. Pyle
By Franklin N. Hough
Attorney

No. 770,925. Patented September 27, 1904.

UNITED STATES PATENT OFFICE.

REESE RYINGER PYLE, OF WILMINGTON, DELAWARE.

DEVICE FOR HOLDING SPOONS.

SPECIFICATION forming part of Letters Patent No. 770,925, dated September 27, 1904.

Application filed March 16, 1904. Serial No. 198,436. (No model.)

*To all whom it may concern:*

Be it known that I, REESE RYINGER PYLE, a citizen of the United States, residing at Wilmington, in the county of Newcastle and State of Delaware, have invented certain new and useful Improvements in Devices for Holding Spoons; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments for spoons; and the object of the invention is to produce simple and efficient means for preventing the spoon from sliding down into a dish, and comprises a snap-hook designed to frictionally engage the shank portion of a spoon and provided with an arm which is adapted to engage the edge of the dish to prevent the same from slipping down into the latter.

My invention consists, further, in certain details of construction, which will be hereinafter fully described and then specifically defined in the appended claims.

I illustrate my invention in the accompanying drawings, in which—

Figure 1:
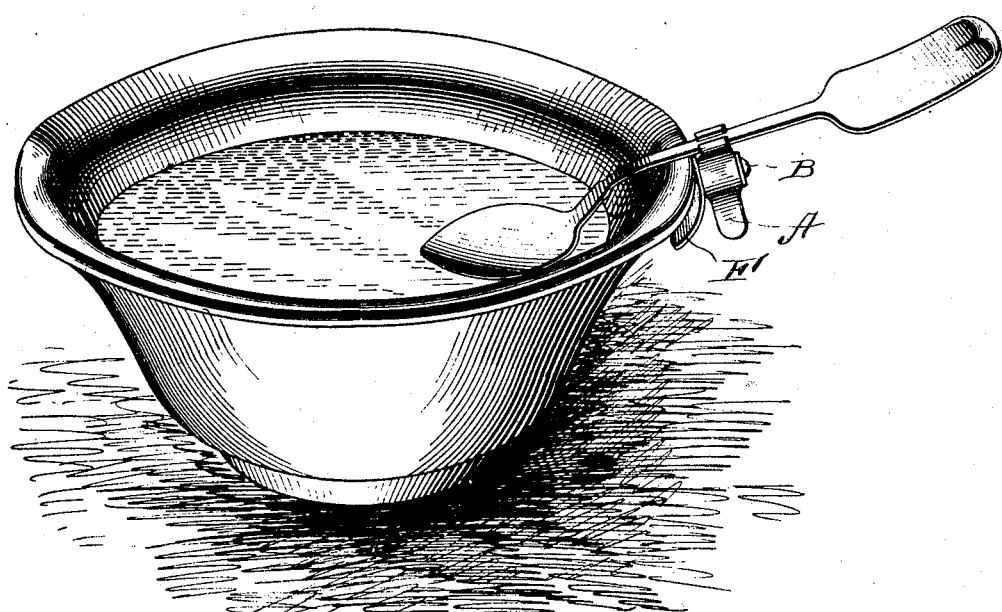
Figure 2:
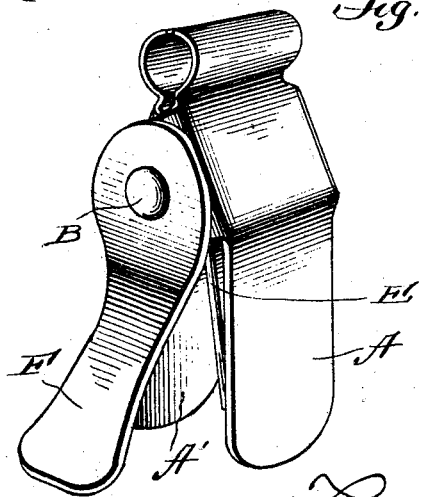

Figure 1 is a perspective view of my device shown as applied to the shank portion of a spoon, showing the manner in which the same is applied to a dish; and Fig. 2 is an enlarged detail view of the device detached.

Reference now being had to the details of the drawings by letter, A and A' designate two jaws which are pivoted together by means of a pin B, and E is a spring which is coiled about said pin, and the ends of said spring bear frictionally against the ends of the shank portions of said jaws and are adapted to hold the jaws normally together. Said jaws are made preferably concaved, so as to conform to and readily engage over the shank portion of a spoon, and F designates an arm which is pivotally mounted upon said pin and preferably curved toward the bowl of the spoon, leaving a space intermediate said curved portion and the lower shank portions of the jaws whereby said attachment and arm may be placed over the edge of a dish, as shown in Fig. 1 of the drawings.

By the provision of a device embodying the features of my invention it will be observed that a simple device is provided for ready attachment to a spoon, thus enabling the spoon to be held at any location along its shank portion and effectually prevent the same from sliding down into a dish.

While I have shown a particular detailed construction of attachment embodying the features of my invention, it will be understood that I may alter the construction of the same as to details without in any way departing from the spirit of the invention.

Having thus fully described my invention, what I claim as new, and desire to secure by Letters Patent, is—

1. An attachment for spoons comprising two spring-actuated jaws pivoted together and adapted to engage the shank portion of a spoon, and a dish-engaging arm carried by said jaws, as set forth.

2. A spoon attachment comprising two concaved jaws, a pin upon which said jaws are mounted, a spring for holding the jaws normally closed, and a curved arm pivotally mounted upon said pin and designed to engage over the edge of a dish, as set forth.

In testimony whereof I hereunto affix my signature in presence of two witnesses.

REESE RYINGER PYLE.

Witnesses:
A. P. BERG,
JOHN F. LYNN.